(12) United States Patent
Billhartz et al.

(10) Patent No.: US 11,546,008 B2
(45) Date of Patent: Jan. 3, 2023

(54) COMMUNICATION SYSTEMS AND METHODS FOR COGNITIVE INTERFERENCE MITIGATION

(71) Applicant: Eagle technology, LLC, Melbourne, FL (US)

(72) Inventors: Thomas J. Billhartz, Melbourne, FL (US); David B. Chester, Palm Bay, FL (US); Chad Chung Lau, Melbourne, FL (US); Jason Calvert, Melbourne, FL (US); Mark D. Rahmes, Melbourne, FL (US); Andrea Ballester, Melbourne, FL (US)

(73) Assignee: Eagle Technology, LLC, Melbourne, FL (US)

( * ) Notice: Subject to any disclaimer, the term of this patent is extended or adjusted under 35 U.S.C. 154(b) by 92 days.

(21) Appl. No.: 17/200,126

(22) Filed: Mar. 12, 2021

(65) Prior Publication Data

US 2022/0294482 A1 Sep. 15, 2022

(51) Int. Cl.
*H04B 1/12* (2006.01)
*G06N 3/04* (2006.01)
*G06N 3/08* (2006.01)

(52) U.S. Cl.
CPC .......... *H04B 1/123* (2013.01); *G06N 3/0445* (2013.01); *G06N 3/08* (2013.01)

(58) Field of Classification Search
CPC .................................................. H04B 1/123
See application file for complete search history.

(56) References Cited

U.S. PATENT DOCUMENTS

| | | | |
|---|---|---|---|
| 6,377,636 B1 | 4/2002 | Paulraj et al. | |
| 6,447,236 B1 | 9/2002 | Grams et al. | |
| 7,756,519 B2 | 7/2010 | Barak et al. | |
| 7,835,698 B2 | 11/2010 | Eyuboglu et al. | |
| 9,972,339 B1* | 5/2018 | Sundaram | G10L 25/30 |
| 2020/0272934 A1* | 8/2020 | Manamohan | G06F 11/1438 |
| 2020/0343985 A1* | 10/2020 | O'Shea | H04B 17/3911 |
| 2021/0150771 A1* | 5/2021 | Huang | G06T 17/005 |

(Continued)

OTHER PUBLICATIONS

Amin, M. G. (1997). Interference mitigation in spread spectrum communication systems using time-frequency distributions. IEEE Transactions on Signal Processing, 45(1), 90-101.

(Continued)

*Primary Examiner* — Hsinchun Liao
(74) *Attorney, Agent, or Firm* — Fox Rothschild LLP; Robert J. Sacco; Carol E. Thorstad-Forsyth

(57) ABSTRACT

Systems and methods for operating a receiver. The methods comprise: receiving, at the receiver, a combined waveform comprising a combination of a desired signal and an interference signal; and performing, by the receiver, demodulation operations to extract the desired signal from the combined waveform. The demodulation operations comprise: obtaining, by the receiver, machine learned models for recovering the desired signal from combined waveforms; comparing, by the receiver, at least one characteristic of the received combined waveform to at least one of the machine learned models; and determining a value for at least one symbol of the desired signal based on results of the comparing.

22 Claims, 11 Drawing Sheets

(56) References Cited

U.S. PATENT DOCUMENTS

2022/0183012 A1* 6/2022 Shahid .............. H04W 72/0413

OTHER PUBLICATIONS

Hosseini, K., Yu, W., & Adve, R. S. (2014). Large-scale MIMO versus network MIMO for multicell interference mitigation. IEEE Journal of Selected Topics in Signal Processing, 8(5), 930-941.

Kwan, R., & Leung, C. (2010). A Survey of Scheduling and Interference Mitigation in LTE.

Nang, I. H., & David, N. C. (2011). Interference mitigation through limited receiver cooperation. IEEE Transactions on Infomnation Theory, 57(5), 2913-2940.

H. Zhang, N. B. Mehta, A. F. Molisch, J. Zhang and S. H. Dai, "Asynchronous interference mitigation in cooperative base station systems," in IEEE Transactions on Wireless Communications, vol. 7, No. 1, pp. 155-165, Jan. 2008, doi: 10.1109/TWC.2008.060193.

\* cited by examiner

COMMUNICATION SYSTEMS AND METHODS FOR COGNITIVE INTERFERENCE MITIGATION

BACKGROUND

Statement of the Technical Field

The present disclosure relates generally to communication systems. More particularly, the present disclosure relates to communication systems and methods for cognitive interference mitigation.

Description of the Related Art

Wireless communication systems exist today and are used in various applications. In the wireless communication systems, desired signals are subject to co-channel communication interference at receivers. The interference may be unintentional (e.g., a Long Term Evolution (LTE) signal interfering with satellite ground-station communications) or intentional (e.g., an adversary jamming/spoofing military communications).

Some of these systems employ interference cancellation to improve wireless communications. The interference cancellation solution may require use of multiple receive antennas. During operations, each of the receive antennas receives a waveform including a combination of the desired signal and an interference signal. The received waveforms are then analyzed to determine how to form a beam and/or steer a beam towards the transmitter of the desired signal. The beam forming and steering allow for cancelation or removal of the interference signal from the received waveforms.

Since receive antennas are expensive, other interference cancellation techniques have been developed which require only a single receive antenna. In the signal receive antenna scenarios, the system acquires and estimates all parameters involved in the production of the interference signal. This is quite difficult to achieve since some of these parameters may be subject to noise in the receiver and the desired signal interferes with the interference signal. Once estimates are obtained for all of the parameters, the interference signal is then reconstructed and subtracted out of the received signal to eliminate or minimize any interference with the desired signal. Residual noise from imperfect parameter estimation decreases the Signal to Noise Ratio (SNR) on the desired signal. Additionally, the single receiver-based solution is resource and computationally intensive.

SUMMARY

The present disclosure concerns implementing systems and methods for operating a receiver. The methods comprise: receiving, at the receiver, a combined waveform comprising a combination of a desired signal and an interference signal; and performing, by the receiver, demodulation operations to extract the desired signal from the combined waveform. The demodulation operations comprise: obtaining, by the receiver, machine learned models for recovering the desired signal from combined waveforms; comparing, by the receiver, at least one characteristic of the received combined waveform to at least one of the machine learned models; and determining a value for at least one symbol of the desired signal based on results of the comparing and/or a previous symbol decision.

The machine learned models may be generated using the same machine learning algorithm or respectively using different machine learning algorithms. A machine learned model may be selected from the machine learned models for use in the comparing based on results of a game theory analysis of the machine learned models. The characteristic of the received combined waveform may include, but is not limited to, a phase characteristic, an amplitude characteristic, a frequency characteristic, or a waveform shape.

The results of the comparing may comprise an identification of a machine learned model that matches the at least one characteristic of the received combined waveform by a given amount. The value for the at least one symbol of the desired signal may be set equal to a symbol value that is associated with the identified machine learned model.

In some scenarios, the demodulation operations comprise comparing characteristic(s) of each segment of a plurality of segments of the combined waveform to the machine learned models to identify a machine learned model that matches the characteristic(s) of the segment by a given amount. At least two segments may both comprise information for at least one given symbol of the desired signal. Each segment may extend over multiple symbol time periods. A value for a symbol for the desired signal contained in the segment of the combined waveform may be equal to a symbol value that is associated with the machine learned model that matches the characteristic(s) of the segment by the given amount.

The implementing systems comprise a processor, and a non-transitory computer-readable storage medium comprising programming instructions that are configured to cause the processor to implement a method for performing demodulation operations to extract the desired signal from the combined waveform.

BRIEF DESCRIPTION OF THE DRAWINGS

The present solution will be described with reference to the following drawing figures, in which like numerals represent like items throughout the figures.

DETAILED DESCRIPTION

Figure 1:
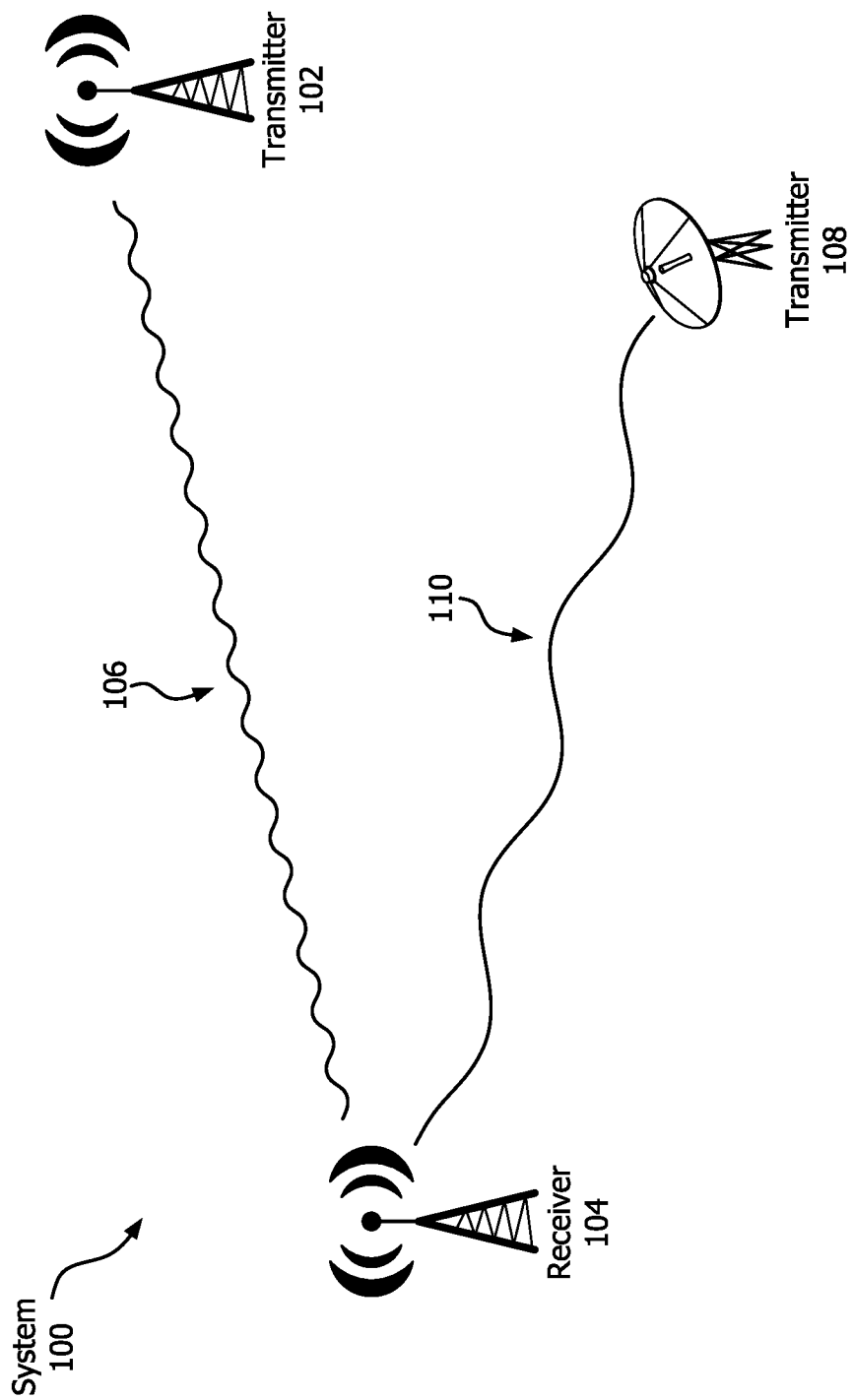
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

As noted above, desired communication signals received over the air may be susceptible to in-band interference. The in-band interference can be caused by intentional jamming (e.g., adversarial jamming/spoofing of military communications) or unintentional interference from in-band sources (e.g., in-band/co-channel terrestrial communications signals interfering with space-communication ground stations). Conventional solutions to the in-band interference issue utilize interference cancellation. Interference cancellation generally involves: estimating parameters of an interference signal; reconstructing the interference signal using the estimated parameters; and subtracting the reconstructed interference signal from a received composite signal to obtain the desired signal. Once all interference signals have been removed from the received composite signal, the original communications data is demodulated. The interference cancellation solution is relatively resource intensive.

The present solution provides a novel way to overcome this drawback of conventional communication systems by employing a machine learning approach to quickly recognize and classify digitally-modulated symbols from noise and interference. The machine learning approach directly demodulates the digital communications data from the received composite signal which includes interference signal(s) and/or noise. The machine learning approach can include, but is not limited to, a deep learning based approach to directly recognize desired data symbols/bits. The machine learning approach is implemented by a neural network that is trained to make decisions on subsets of an overall window of data. The window extends over multiple data symbol periods and provides context to assist the neural network in deciding how to properly demodulate the desired signal. The trained neural network is able to recognize a-priori expected features of a desired signal and reject everything else.

The present solution can be implemented by methods for operating a receiver. The methods comprise: receiving a combined waveform comprising a combination of a desired signal and an interference signal; and performing demodulation operations to extract the desired signal from the combined waveform. The demodulation operations comprise: obtaining machine learned models for recovering the desired signal from combined waveform; optionally selecting one or more machine learned models based on a given criteria (e.g., based on results of a game theory analysis of the machine learned models); comparing characteristic(s) of the received combined waveform to the machine learned model(s); and determining a value for at least one symbol of the desired signal based on results of the comparing and/or a previous symbol decision. The machine learned models may be generated using the same machine learning algorithm or respectively using different machine learning algorithms. The characteristic(s) of the received combined waveform may include, but is(are) not limited to, a phase characteristic (e.g., a phase change over time), an amplitude characteristic (e.g., an average amplitude over time), a frequency characteristic (e.g., a change in frequency over time), or a waveform shape.

The results of the comparing may comprise an identification of a machine learned model that matches the characteristic(s) of the received combined waveform by a given amount (e.g., >50%). The value for the symbol(s) of the desired signal may be set equal to symbol value(s) that is(are) associated with the identified machine learned model.

In some scenarios, the methods comprise comparing characteristic(s) of each segment of a plurality of segments of the combined waveform to the machine learned models to identify a machine learned model that matches the characteristic(s) of the segment by a given amount. At least two segments may both comprise information for at least one given symbol of the desired signal. Each segment may extend over multiple symbol time periods. A value for a symbol for the desired signal contained in the segment of the combined waveform may be set equal to a symbol value that is associated with the machine learned model that matches the characteristic(s) of the segment by the given amount.

The implementing systems of the present solution may comprise a processor, and a non-transitory computer-readable storage medium comprising programming instructions that are configured to cause the processor to implement above described method.

Referring now to FIG. 1, there is provided an illustration of an illustrative communications system 100. Communications system 100 is generally configured to allow communications amongst communication devices 100, 102 with improved signal demodulation and interference cancellation. In this regard, the communications system 100 comprises a transmitter 102 and a receiver 104. Transmitter 102 is configured to generate an analog signal and communicate the same to a receiver 104 over a communications link 106. At the receiver 104, machine learning operations are performed to quickly extract a desired signal from a received signal comprising noise and/or in-band, interference signal(s) communicated from at least one other transmitter 108 via communications link(s) 110. Transmitters are well known in the art.

Figure 2:
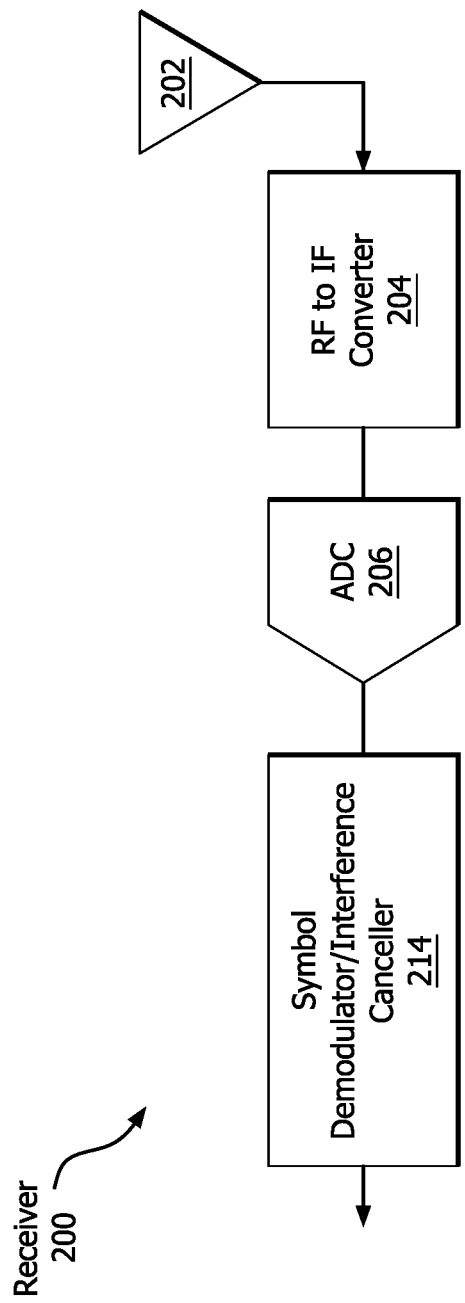
FIG. 2 is a block diagram of an illustrative receiver.

A more detailed diagram of the receiver 200 is provided in FIG. 2. Receiver 104 of FIG. 1 can be the same as or substantially similar to receiver 200. As such, the discussion of receiver 200 is sufficient for understanding receiver 104 of FIG. 1.

As shown in FIG. 2, receiver 200 is comprised of an antenna 202, an RF-to-IF converter 204, an Analog-to-Digital Converter (ADC) 206, and a symbol demodulator/interference canceller 214. Antenna 202 is configured to receive signals transmitted from transmitters (e.g., transmitter 102 and/or 108 of FIG. 1). Antenna 202 is also configured to communicate received signals to RF-to-IF converter 204. RF-to-IF converter 204 is configured to translate in frequency a relatively high-frequency RF signal to a different frequency IF signal. Apparatus and methods for performing RF-to-IF conversions are well known in the art. Any known or to be known apparatus or method for performing RF-to-IF conversions can be used herein. The output of the RF-to-IF converter 204 is passed to the input of the Analog-to-Digital Converter (ADC) 206. ADC 206 is configured to convert analog voltage values to digital values, and communicate the digital values to the subsequence device 214. The subsequent device includes a symbol demodulator/interference canceller 214.

Figure 3:
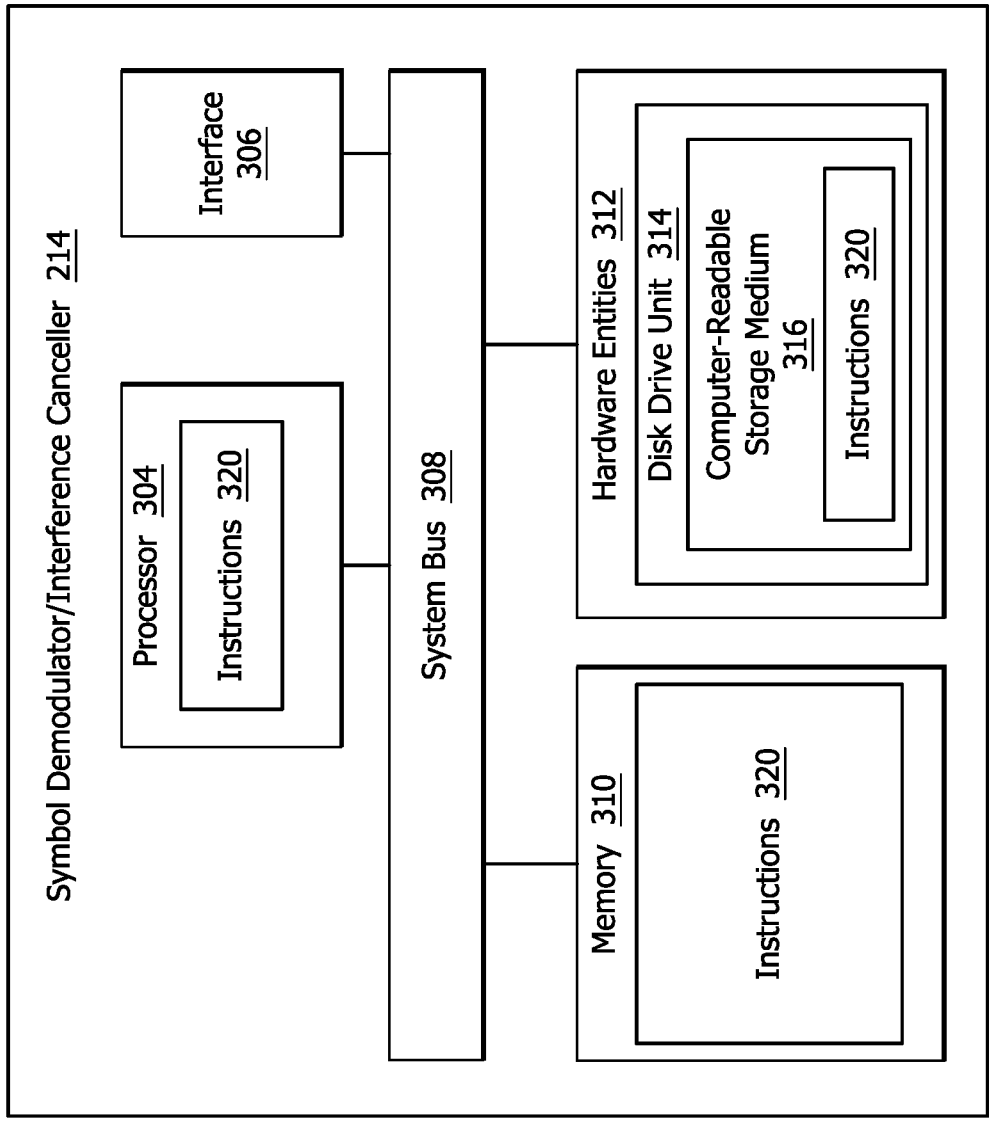
FIG. 3 is a block diagram of an illustrative symbol demodulator/interference canceller.

A more detailed diagram of the symbol demodulator/interference canceller 214 is provided in FIG. 3. Symbol demodulator/interference canceller 214 implements a machine learning algorithm to perform interference mitigation for accurately determining symbols of desired signals which is embedded in interference and/or noise. In this regard, the symbol demodulator/interference canceller 214 includes a plurality of components shown in FIG. 3. The symbol demodulator/interference canceller 214 may include more or fewer components than those shown in FIG. 3. However, the components shown are sufficient to disclose an illustrative solution implementing the present solution. The hardware architecture of FIG. 3 represents one implementation of a representative symbol demodulator/interference canceller configured to enable extraction of a desired signal from a received combined waveform comprising noise and/or an interference signal as described herein. As such, the symbol demodulator/interference canceller 214 of FIG. 3 implements at least a portion of the method(s) described herein.

The symbol demodulator/interference canceller 214 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 3, the symbol demodulator/interference canceller 214 comprises a processor 304, an interface 306, a system bus 308, a memory 310 connected to and accessible by other portions of symbol demodulator/interference canceller 214 through system bus 308, and hardware entities 312 connected to system bus 308. The interface 306 provides a means for electrically connecting the symbol demodulator/interference canceller 214 to other circuits of the receiver (e.g., ADC 206, RF-to-IF converter 204, and/or antenna 202 of FIG. 2).

At least some of the hardware entities 312 perform actions involving access to and use of memory 310, which can be a Random Access Memory (RAM), and/or a disk driver. Machine learned models are stored in memory 310 for use in demodulation operations as described herein. Hardware entities 312 can include a disk drive unit 314 comprising a computer-readable storage medium 316 on which is stored one or more sets of instructions 320 (e.g., software code) configured to implement one or more of the methodologies, procedures, or functions described herein. The instructions 320 can also reside, completely or at least partially, within the memory 310 and/or within the processor 304 during execution thereof by the symbol demodulator/interference canceller 214. The memory 310 and the processor 304 also can constitute machine-readable media. The term "machine-readable media", as used here, refers to a single medium or multiple media (e.g., a centralized or distributed database, and/or associated caches and servers) that store the one or more sets of instructions 320. The term "machine-readable media", as used here, also refers to any medium that is capable of storing, encoding or carrying a set of instructions 320 for execution by the processor 304 and that cause the processor 304 to perform any one or more of the methodologies of the present disclosure.

The machine learning algorithm(s) of the symbol demodulator/interference canceller 214 is(are) trained by generating signals (either synthetically or though capturing of real signals) that are expected from transmitter(s) (e.g., transmitter 102 of FIG. 1) of desired signals and transmitter(s) (e.g., transmitter 108 of FIG. 1) of interference signals during operations of a communication system (e.g., communication system 100 of FIG. 1). The generated signals are then analyzed to detect patterns therein and produce model(s) of what is expected in a given environment. Each machine learned model specifies a pattern of one or more characteristics of a given combined waveform including a desired signal, noise, and/or an interference signal. One or more symbols of the desired signal is/are associated with the machine learned model(s). For example, the binary symbols "01" are associated with a first machine learned model, while the binary symbols "10" are associated with a second machine learned model. The present solution is not limited to the particulars of this example. The machine learned models can be generated using the same or different machine learning algorithms.

During operations of the receiver, the machine learned models are used by the symbol demodulator/interference canceller 214 to (i) recognize a desired signal embedded in interference and/or noise, (ii) directly mitigate the interference and noise, and (iii) determine the symbols included in the original desired signal. This machine learning based approach for interference mitigation does not involve estimation or acquisition of interference signals by the receiver. Rather, the machine learning based approach simply involves comparing the characteristic(s) of a received combined signal to machine learned models to identify which machine learned model(s) match(es) the characteristic(s) of the received combined signal by a given amount (e.g., >70%), and output values for symbol(s)/bit(s) that are associated with the matching machine learned model(s). The output symbol(s)/bit(s) represent(s) the symbol(s)/bit(s) which should have been received by the receiver from a transmitter of a desired signal. The machine learning based approach is relatively inexpensive to implement as compared to conventional interference mitigation approaches, at least partially because the machine learning exploits the internal or inherent structures of digitally modulated communication signals (desired and interference signals) in both time and frequency. The inherent structures of digitally modulated communication signals provides features that are recognizable by a machine learning algorithm.

Figure 5:
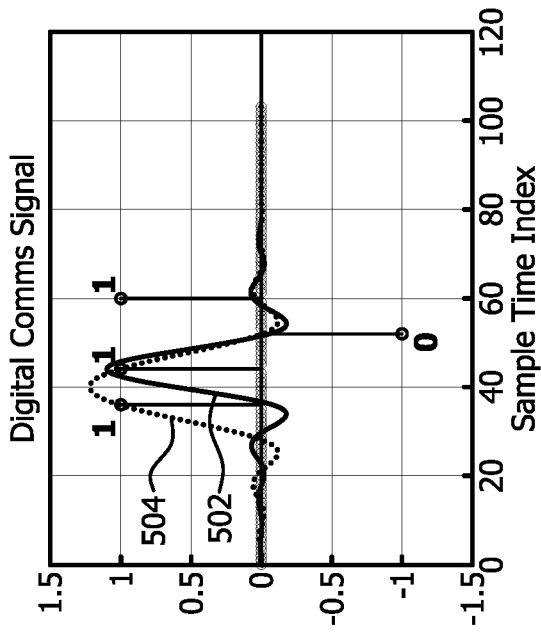
FIGS. 4-7 provide graphs that are useful for understanding digital communications.
Figure 7:
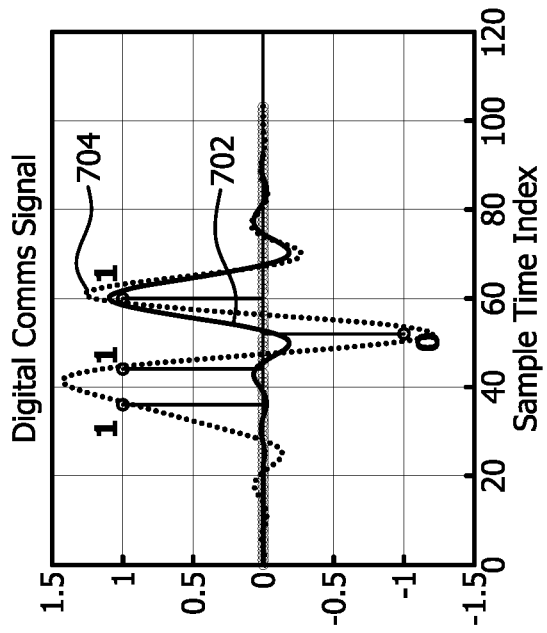
Figure 4:
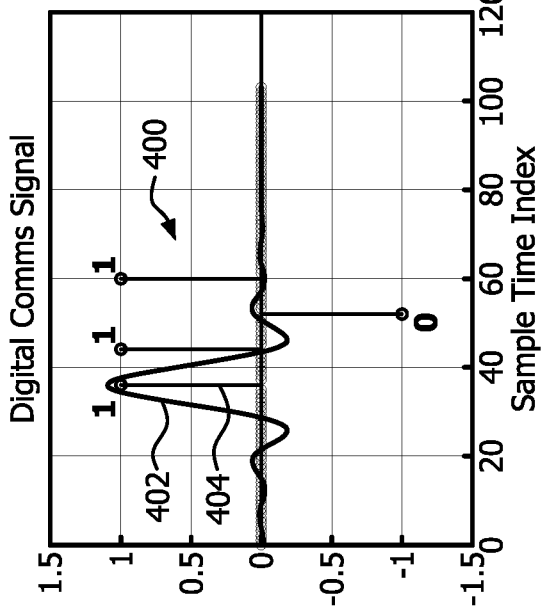
Figure 6:
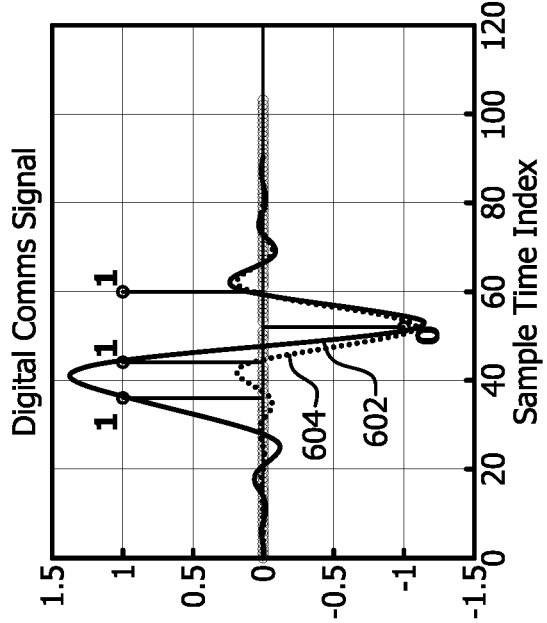

In digital communications, it is assumed that there is a data stream in a received combined signal. For example, as shown in FIGS. 4-7, a data stream 400 is transmitted from a transmitter (e.g., transmitter 102 of FIG. 1). The data stream includes a sequence of symbols or bits 1101. Each symbol/bit of the data stream 400 is transmitted as a pulse waveform 402, 502, 602, 702 from the transmitter. Each pulse waveform extends over a finite period of time which is wider than a time index 404 representing a symbol/bit. As shown in FIG. 4, the pulse waveform 402 of the first symbol/bit overlaps with subsequent symbols/bits. When the pulse waveform 502 of the second symbol/bit is transmitted, the transmitted waveform represents the sum of the pulse waveforms 402, 502 because the first and second symbols/bits are adding together. The transmitted waveform for the second symbol/bit is shown in FIG. 5 as a composite waveform 504 which has an increased amplitude as compared to pulse waveform 502. The third bit is a zero which is represented by a negative pulse waveform 602. The negative pulse waveform 602 extends to the previous symbols/bits facilitating the increased amplitude of the composite waveform 504. The transmitted waveform for the third symbol/bit is shown in FIG. 6 as a composite waveform 604 since the first, second and third symbols/bits are being added together. The fourth symbol/bit is a one which is represented by a positive pulse waveform 702. The positive pulse waveform 702 extends to the previous symbols/bits, and therefore contributes to the amplitudes of composite waveforms 504, 604. The transmitted waveform for the fourth symbol/bit is shown in FIG. 7 as a composite waveform 704 since the first, second, third and fourth symbols/bits are being adding together.

As evident from FIGS. 4-7, each digital symbol/bit effects the transmitted waveform of neighbor symbols/bits. Thus, every time a pulse waveform is received at the receiver 200, the receiver is receiving information about a plurality of symbols/bits rather than just one symbol/bit. In general, the machine learning structure of the receiver 200 is trying to recognize symbols in accordance with the digital communications scheme of FIGS. 4-7 and in the presence of noise/interference.

Figure 8:
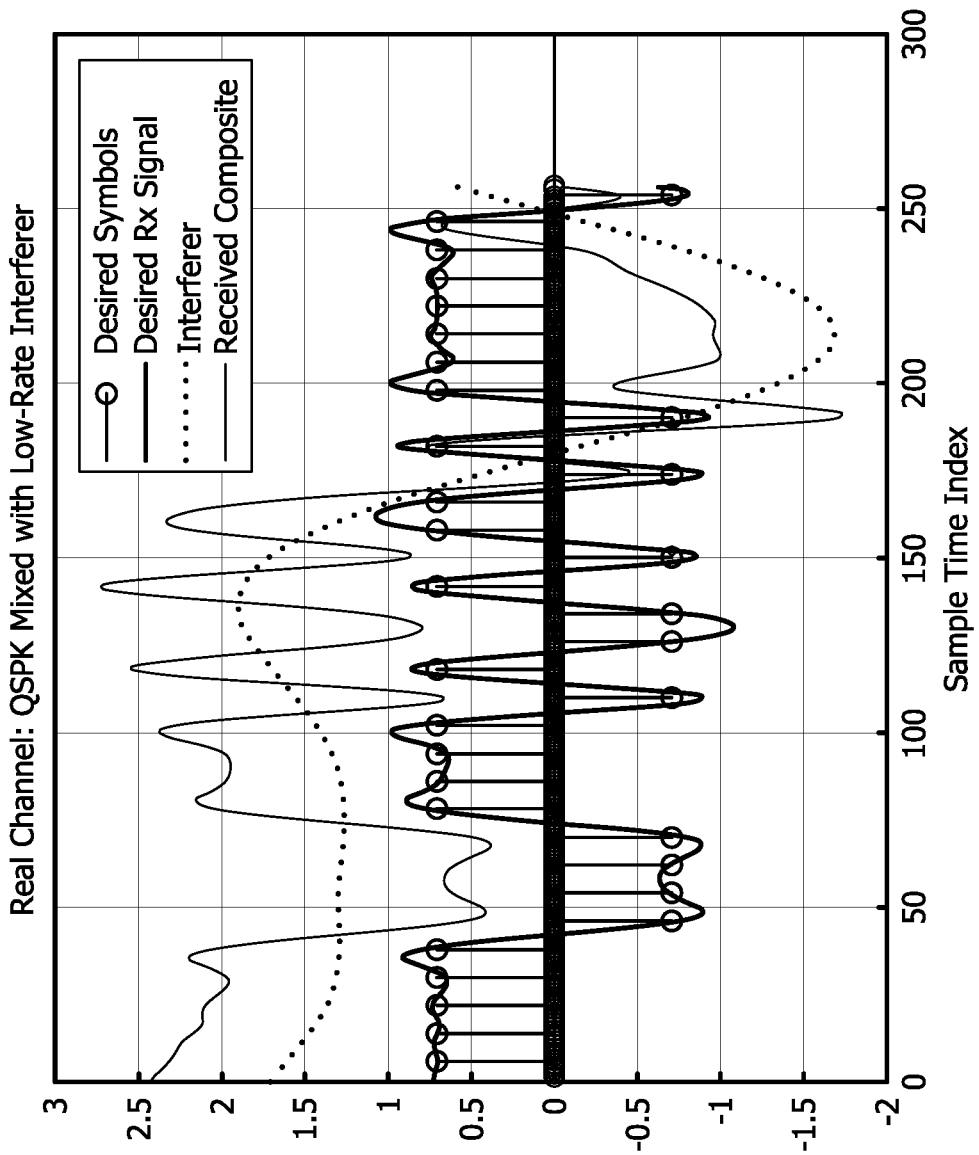
FIGS. 8-10 provide graphs that are useful for understanding symbol demodulation and interference cancellation operations performed by a receiver.

With reference to FIG. 8, a desired signal including a sequence of symbols/bits 1111100001111010010110101111110 is transmitted from a transmitter (e.g., transmitter 102 of FIG. 1). The transmitted waveform for this sequence of symbols/bits is shown as waveform 802. An interference signal transmitted from another transmitter (e.g., transmitter 108 of FIG. 1) is shown as waveform 804. The interference waveform 804 has a higher power than the desired waveform 802, and the rate at which symbols/bits are transmitted is different than the rate at which the symbols/bits of the desired signal are transmitted. The receiver 200 receives a waveform 806 which is a combination of the desired waveform 802 and the interference waveform 804.

Figure 9:
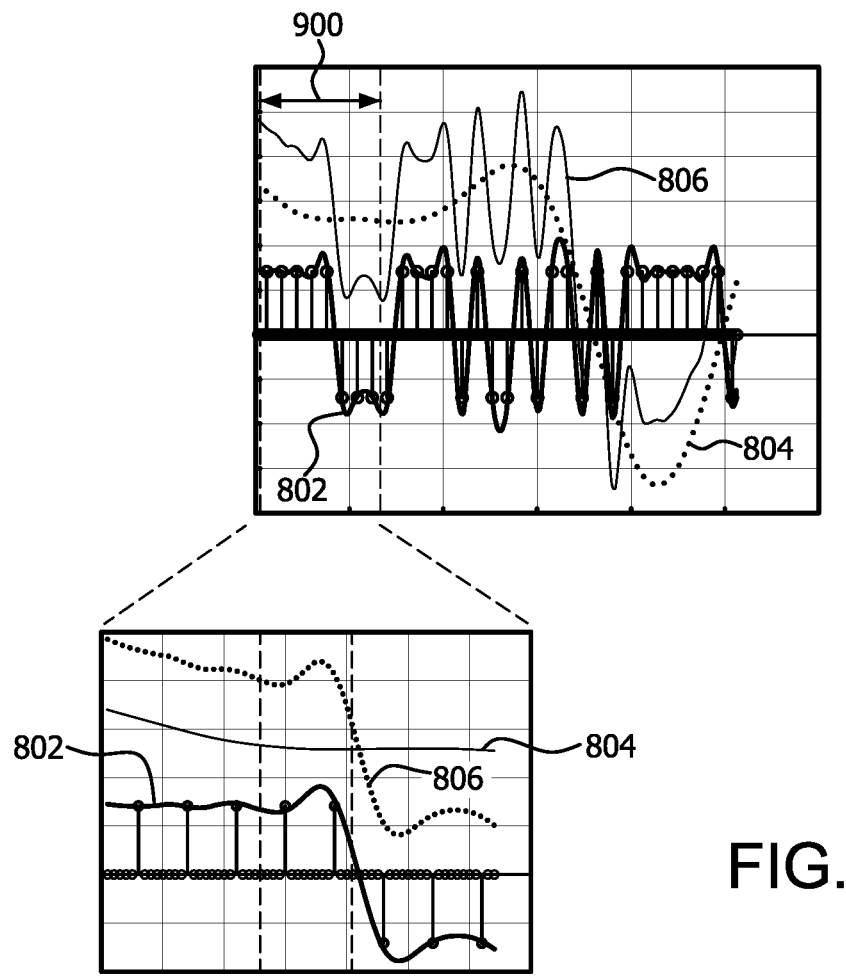
Figure 10:
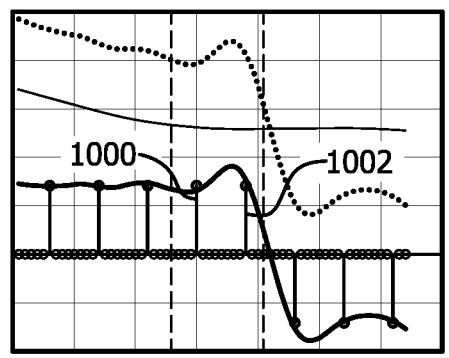

When performing symbol demodulation, the receiver 200 analyzes the received combined waveform 806 over multiple symbol/bit time periods to recover the symbols/bits. More particularly, the symbol demodulator/interference canceller 214 analyzes a portion/segment of a received signal present within in a given context window 900 shown in FIG. 9 to recover value(s) for the middle symbol(s)/bit(s) (e.g., symbols/bits 1000 and 1002 of FIG. 10) thereof. The context window is then slid in time so that another portion/segment of the received signal is analyzed by the symbol demodulator/interference canceller 214 to demodulate next symbol(s)/bit(s). This process is iteratively repeated until all of the symbol(s)/bit(s) in the desired signal are demodulated. The context windows can be overlapping or non-overlapping. In this regard, two portions/segments of the received signal can include information for one or more of the same symbols/bits, or information for none of the same symbol(s)/bit(s).

Notably, the context window 900 provides context to the symbol demodulator/interference canceller 214 so that the symbol demodulator/interference canceller 214 can observe how an interference signal has been impacting the desired signal over a given period of time. Accordingly, the context window 900 includes information for symbols/bits that reside prior to and subsequent to the symbols/bits 1000, 1002 to be demodulated. In effect, the symbol demodulator/interference canceller 214 implements the machine learning algorithm that considers the context of signal structure in a neighborhood of the symbol(s)/bit(s) to facilitate recovery of desired symbol(s)/bit(s). The machine learning algorithm is trained to identify patterns of combined waveforms within received signals on windows of time over multiple symbol/data periods, and to determine values for symbol(s)/bit(s) of desired waveforms given the identified patterns of the combined waveforms present within the received signals.

The machine learning algorithm can employ supervised machine learning, semi-supervised machine learning, unsupervised machine learning, and/or reinforcement machine learning. Each of these listed types of machine learning algorithms is well known in the art. In some scenarios, the machine learning algorithm includes, but is not limited to, a deep learning algorithm (e.g., a Residual Neural Network (ResNet)), a Recurrent Neural Network (RNN) (e.g., a Long Short-Term Memory (LSTM) neural network), a decision tree learning algorithm, an association rule learning algorithm, an artificial neural network learning algorithm, an inductive logic programming based algorithm, a support vector machine based algorithm, a Bayesian network based algorithm, a representation learning algorithm, a similarity and metric learning algorithm, a sparse dictionary learning algorithm, a genetic algorithm, a rule-based machine learning algorithm, and/or a learning classifier system based algorithm. The machine learning process implemented by the present solution can be built using Commercial-Off-The-Shelf (COTS) tools (e.g., SAS available from SAS Institute Inc. of Cary, North Carolina).

Figure 11:
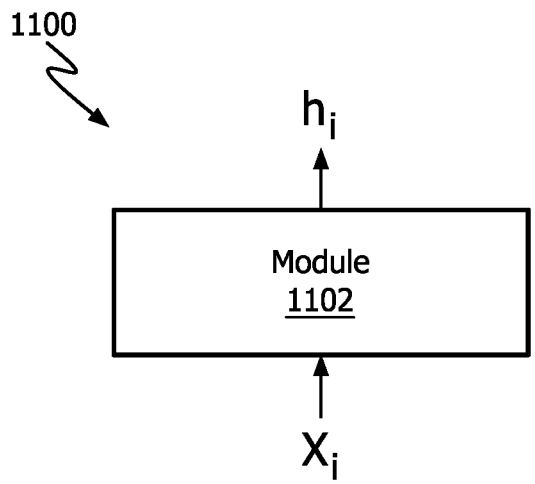
FIGS. 11-15 provide illustrations that are useful for understanding implementations of machine learning algorithms in receivers for facilitating symbol demodulation and interference cancellation.

An illustrative architecture for a neural network implementing the present solution is provided in FIG. 11. As shown in FIG. 11, the neural network 1100 comprises a module 1202 that sequentially performs iterations or cycles of the machine learning algorithm. During each iteration or cycle, the module 1102 receives an input $x_i$ and generates an output $h_i$. The input $x_i$ is provided in a time domain (e.g., defines a waveform shape), and comprises a portion/segment of the received signal within a context window (e.g., context window 900 of FIG. 9). The output $h_i$ comprises binary value(s) for symbol(s)/bit(s).

The present solution is not limited to the neural network architecture shown in FIG. 11. For example, the neural network can include a plurality of modules that perform the machine learning algorithm (using respective inputs) in a parallel manner.

Figure 12:
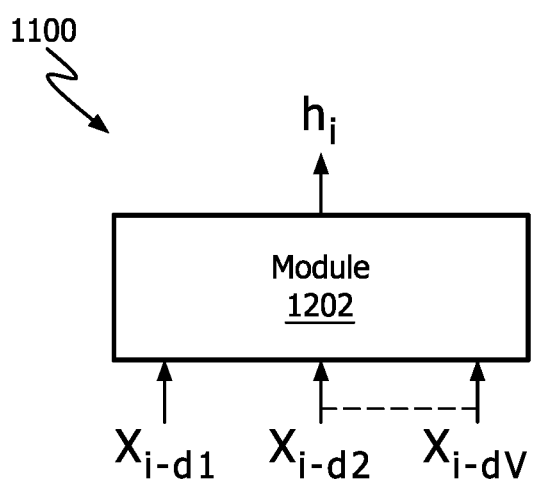

Another illustrative architecture for a neural network implementing the present solution is provided in FIG. 12. As shown in FIG. 12, the neural network 1200 comprises a module 1202 that sequentially performs iterations or cycles of the machine learning algorithm. During each iteration or cycle, the module 1202 receives a plurality of inputs $x_{i-d1}$, $x_{i-d2}$, ..., $x_{i-dV}$ and generates an output $h_i$. The inputs are provided in different domains. For example, input $x_{i-d1}$ is provided in a time domain, and defines a waveform shape of a portion/segment of the received signal within a context window (e.g., context window 900 of FIG. 9). Input $x_{i-d2}$ is provided in a phase domain (e.g., defining a change in phase over time), while input $x_{i-dV}$ is provided in an amplitude domain (e.g., defining an average amplitude over time), a frequency domain (e.g., defining a change in frequency over time) or other domain. The inputs $x_{i-d2}$, ..., $x_{i-dV}$ can be derived using various algorithms that include, but are not limited to, a Fourier transform algorithm, a power spectral density algorithm, a wavelet transform algorithm, and/or a spectrogram algorithm. The module 1202 compares a combination of the inputs to machine learned models to determine the binary values for the desired signal's symbol(s)/bit(s). The inputs $x_{i-d1}$, $x_{i-d2}$, ..., $x_{i-dV}$ may be weighted differently by the machine learning algorithm employed by module 1202. The weights can be pre-defined, or dynamically determined based on characteristic(s) of the received combined waveform.

The present solution is not limited to the neural network architecture shown in FIG. 12. For example, the neural network can include a plurality of modules that perform the machine learning algorithm (using respective inputs) in a parallel manner.

Figure 13:
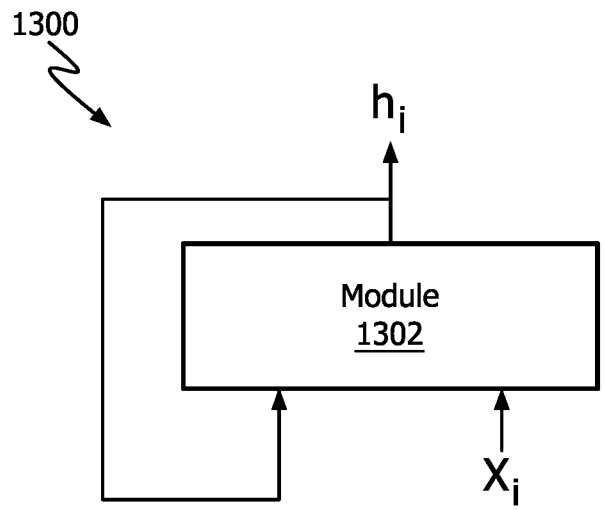

In recurrent neural network scenarios, the receiver uses reasoning about previous symbol/bit decisions to inform later symbol/bit decisions. An illustrative architecture 1300 for a recurrent neural network is provided in FIG. 13. As shown in FIG. 13, the architecture 1300 comprises a module 1302 that sequentially performs iterations or cycles of the machine learning algorithm. During a first iteration or cycle, the module 1302 receives an input $x_i$ and generates an output $h_i$. The input $x_i$ is provided in a time domain, and defines a waveform shape of a portion/segment of the received signal within a context window (e.g., context window 900 of FIG. 9). The output $h_i$ comprises binary value(s) for symbol(s)/bit(s). During a second iteration or cycle, the module 1302 not only receives as an input the time domain information $x_i$ but also the previous output $h_i$. The module 1202 compares a combination of the inputs $x_i$, $h_i$ to machine learned models to determine the binary value(s) for the desired signal's symbol(s)/bit(s), and so on.

Figure 14:
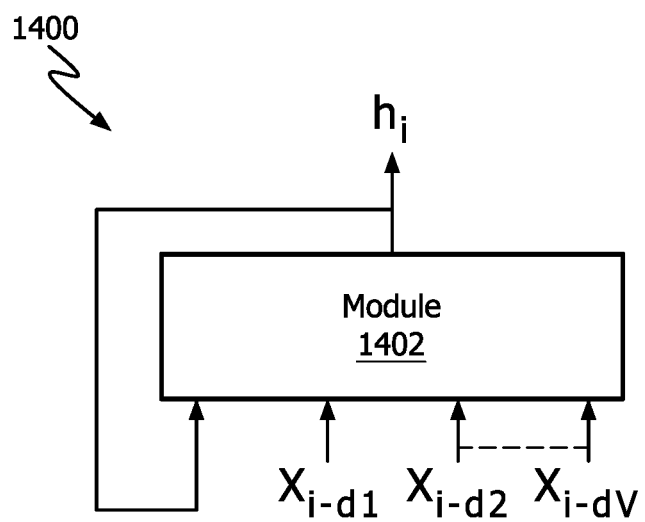

Another illustrative architecture for a recurrent neural network implementing the present solution is provided in FIG. 14. As shown in FIG. 14, the recurrent neural network 1400 comprises a module 1402 that sequentially performs iterations or cycles of the machine learning algorithm. During a first iteration or cycle, the module 1402 receives a plurality of inputs $x_{i-d1}$, $x_{i-d2}$, ..., $x_{i-dV}$ and generates an output $h_i$. The inputs are provided in different domains. For example, input $x_{i-d1}$ is provided in a time domain, and defines a waveform shape of a portion/segment of the received signal within a context window (e.g., context window 900 of FIG. 9). Input $x_{i-d2}$ is provided in a phase domain (e.g., defining a change in phase over time), while input $x_{i-dV}$ is provided in an amplitude domain (e.g., defining an average amplitude over time), a frequency domain (e.g., defining a change in frequency over time) or other domain. The inputs $x_{i-d2}$, ..., $x_{i-dV}$ can be derived using various algorithms that include, but are not limited to, a Fourier transform algorithm, a power spectral density algorithm, a wavelet transform algorithm, and/or a spectrogram algorithm. The module 1402 compares a combination of the inputs to machine learned models to determine the binary values for the desired signal's symbol(s)/bit(s). The inputs $x_{i-d1}$, $x_{i-d2}$, ..., $x_{i-dV}$ may be weighted differently by the machine learning algorithm employed by module 1402. During a second iteration or cycle, the module 1402 not only receives inputs $x_{i-d1}$, $x_{i-d2}$, ..., $x_{i-dV}$ but also receives the previous output $h_i$. The module 1402 compares a combination of the inputs $x_{i-d1}$, $x_{i-d2}$, ..., $x_{i-dV}$, $h_i$ to machine learned models to determine binary value(s) for the desired signal's symbol(s)/bit(s), and so on.

Figure 15:
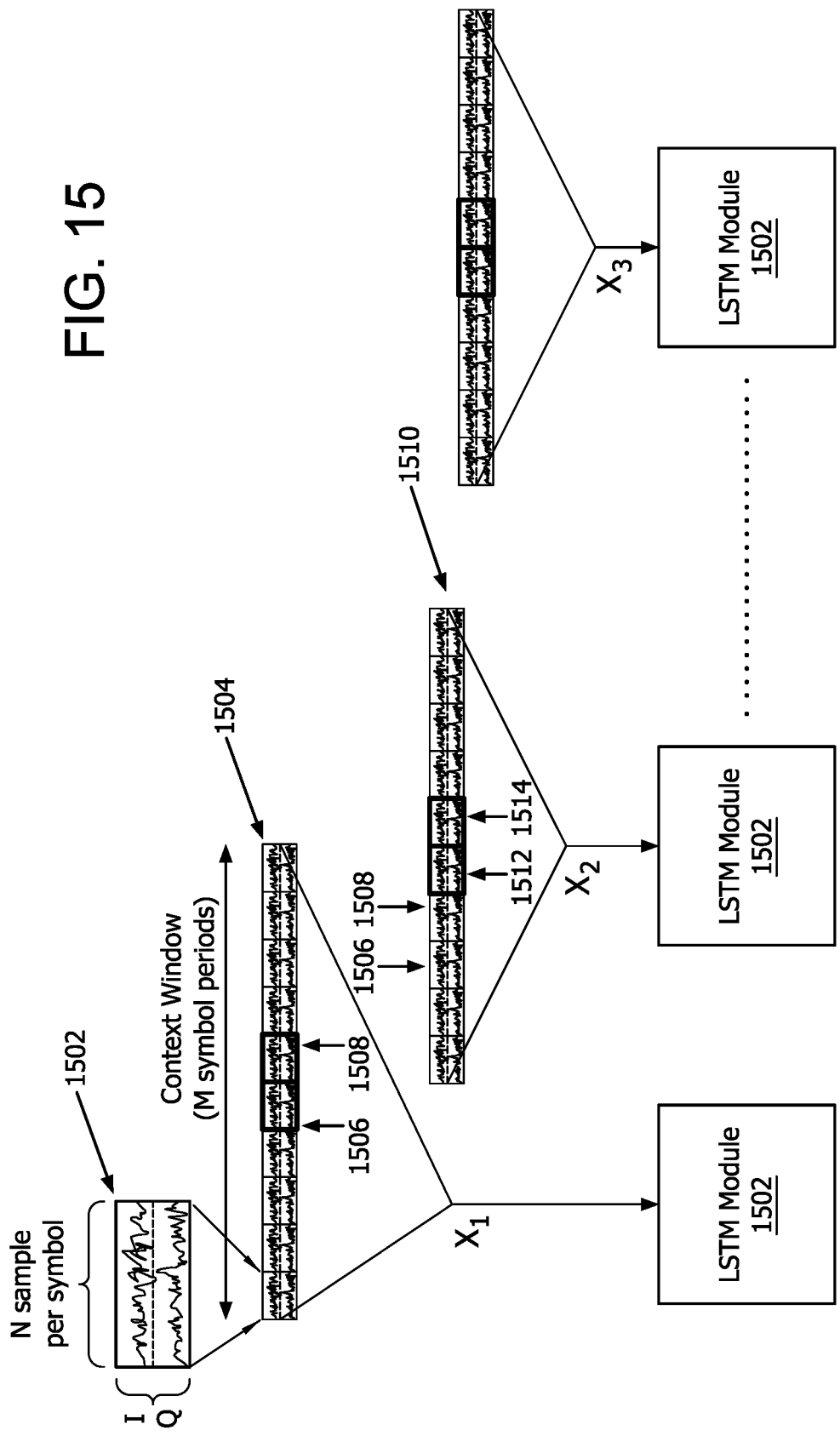

In some scenarios, the recurrent neural network may be implemented by an LSTM algorithm. The LSTM algorithm may be implemented by an LSTM module 1502 being applied over and over again for demodulating a group of symbols, as shown in FIG. 15. The LSTM module 1502 evolves its weights over time due to the learning process. During each iteration, the LSTM module receives a different portion/segment of a received signal (e.g., signal 806 of FIGS. 8-10) as an input. For example, during a first iteration, the LSTM module 1502 is provided portion/segment 1502 of the received signal. Portion/segment 1502 is contained in a context window 1504 including M symbol periods, where M is an integer (e.g., 10). Portion/segment 1502 is processed by the LSTM module 1502 to recover values for the two middle symbols/bits 1506, 1508. During a second iteration, the LSTM module 1502 is provided portion/segment 1510 of the received signal. Portion/segment 1510 is selected by sliding the context window 1504 over by G symbol periods (e.g., 2 symbol periods) as shown in FIG. 15, where G is an integer. Portion/segment 1510 is processed by the LSTM module 1502 to recover values for the two middle symbols/bits 1512, 1514 of the slid context window. Notably, knowledge about the signal structure learned by the LSTM module 1502 during the first iteration is used by the LSTM module 1502 during the second iteration for determining the values for symbols/bits 1512, 1514. This process is repeated for each next iteration, where the LSTM module uses knowledge of the symbol/bit values gained by previous iterations. The context window can be slid in two directions — forwards and backwards. In this way, the LSTM neural network learns the structure over the time of the entire sequence of symbols/bits in multiple directions (i.e., forwards and backwards). Incorporating LSTM layers in the symbol demodulator/interference canceller 214 can provide robustness channel imperfections/perturbations such as but not limited to Carrier Frequency Offset (CFO) with an improved Bit Error Rate (BER).

In some scenarios, a plurality of different machine learning algorithms are employed by the symbol demodulator/interference canceller 214. During each iteration of a symbol/bit decision process, one of the machine learning algorithms may be selected for use in determining values for symbol(s)/bit(s). The machine learning algorithm may be selected based on results of a game theory analysis of the machine learned models. The following discussion explains an illustrative game theory analysis.

Typical optimization of a reward matrix in a one-sided, "game against nature" with a goal of determining the highest minimum gain is performed using linear programming techniques. In most cases, an optimal result is obtained, but occasionally one or more constraints eliminate possible feasible solutions. In this case, a more brute-force subset summing approach can be used. Subset summing computes the optimal solution by determining the highest gain decision after iteratively considering all subsets of the possible decision alternatives.

A game theory analysis can be understood by considering an exemplary tactical game. Values for the tactical game are presented in the following TABLE 1. The unitless values range from −5 to 5, which indicate the reward received performing a given action for a particular scenario. The actions for the player correlate in the rows in TABLE 1, while the potential scenarios correlate to the columns in TABLE 1. For example, the action of firing a mortar at an enemy truck yields a positive reward of 4, but firing a mortar on a civilian truck yeils a negative reward of −4, i.e., a loss. The solution can be calculated from a linear program, with the results indicating that the best choice for the play is to advance rather than fire mortar or do nothing. In examples with very large reward matrices, the enhancement technique of subset summing may also be applied. Since there are four scenarios in this example (enemy truck, civilian truck, enemy tank, or friendly tank), there are $2^4=16$ subsets of the four scenarios. One of these subsets considers none of the decisions, which is impractical. So in practice, there are always $2^P-1$ subsets, where P is the number of columns (available scenarios) in a reward matrix. Table 1 is reproduced from the following document: Jordan, J. D. (2007). Updating Optimal Decisions Using Game Theory and Exploring Risk Behavior Through Response Surface Methodology.

TABLE 1

| | Enemy Truck | Civilian Truck | Enemy Tank | Friendly Tank |
|---|---|---|---|---|
| Fire Mortar | 4 | −4 | 5 | −5 |
| Advance | 1 | 4 | 0 | 4 |
| Do Nothing | −1 | 1 | −2 | 1 |

The goal of linear programming is to maximize a function over a set constrained by linear inequalities and the following mathematical equations (1)-(7).

$$\max z = v + 0w_1 + 0w_2 + 0w_3 \quad (1)$$

$$s.t. \ v \leq 4w_1 + 1w_2 + -1w_3 \quad (2)$$

$$v \leq -4w_1 + 4w_2 + 1w_3 \quad (3)$$

$$v \leq 5w_1 + 0w_2 + -2w_3 \quad (4)$$

$$v \leq -5w_1 + 4w_2 + 1w_3 \quad (5)$$

$$\Sigma w_i = 1 \quad (6)$$

$$w_i \geq 0 \forall i \quad (7)$$

where z represents the value of the game or the objective function, v represents the value of the constraints, $w_1$ represents the optimal probability solution for the choice "Fire Mortar", $w_2$ represents the optimal probability solution for the choice "Advance", $w_3$ represents the optimal probability solution for the choice "Do Nothing", and i represents the index of decision choice. Using a simplex algorithm to solve the linear program yields mixed strategy {0.2857, 0.7143, 0}. To maximize minimum gain, the player should fire a mortar approximately 29% of the time, advance 71% of the time, and do nothing none of the time.

In scenarios with very large reward matrices, the optional technique of subset summing may be applied. The subset summing algorithm reduces a constrained optimization problem to solving a series of simpler, reduced-dimension constrained optimization problems. Specifically, for a reward matrix consisting of P scenarios (columns), a set of $2^P-1$ new reward matrices are created by incorporating unique subsets of the scenarios. To illustrate the generation of the subsets to be considered, the following mathematical equation (8) shows an example of constraints from the example of TABLE 1 where each row in the equation corresponds to a row in the reward matrix A. Each new reduced reward matrix is formed by multiplying A element-wise by a binary matrix. Each of the $2^P-1$ binary matrices has a unique set of columns which are all-zero. The element-wise multiplication serves to mask out specific scenarios, leaving only specific combinations, or subsets, of the original scenarios to be considered. This operation increases the run time, but is a necessary trade-off for improved accuracy. This method also ensures that the correct answer is found by computing the proper objective function. If, for example, A represents a reward matrix, then the solution for computing all combinations of rows is:

$$A.*\begin{bmatrix} 1 & 1 & 0 & 1 \\ 1 & 1 & 0 & 1 \\ 1 & 1 & 0 & 1 \end{bmatrix} \quad (8)$$

Figure 16:
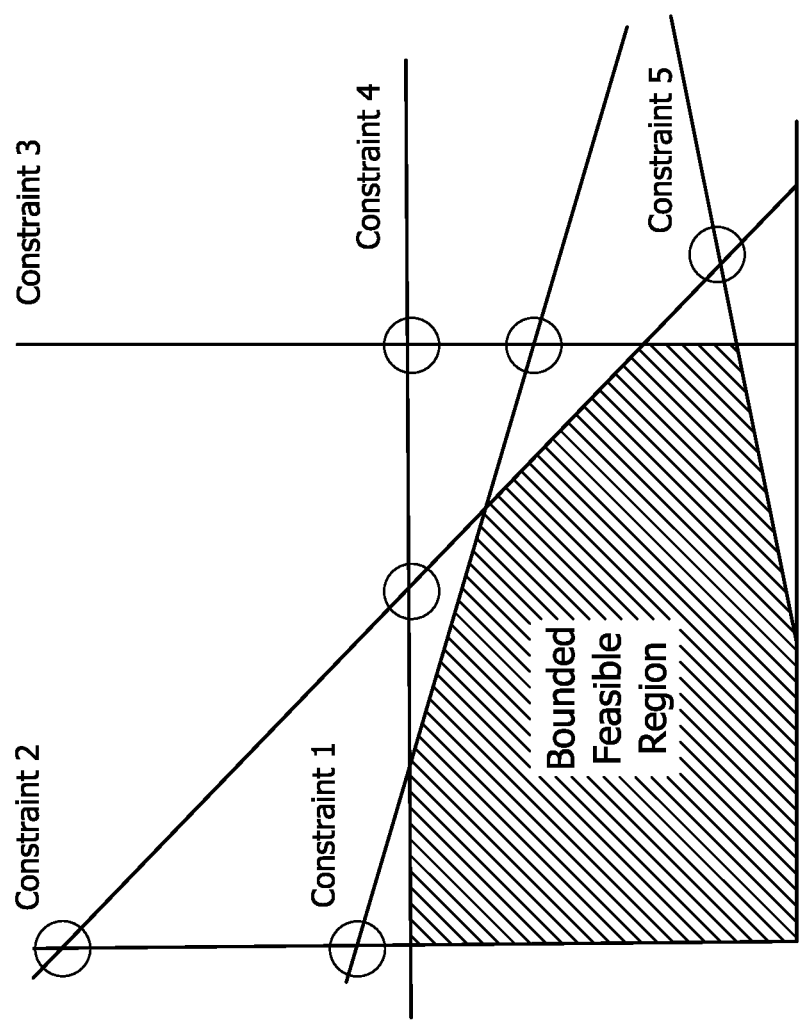
FIG. 16 provides a graph that is useful for understanding game theory.

One reason for running all combinations of decisions, $2^P-1$, where P is the number of columns in a reward matrix, is that one or more constraints eliminate(s) possible feasible solutions, as shown in FIG. 16 with circles. A feasible region is a graphical solution space for the set of all possible points of an optimization problem that satisfy the problem's constraints. Information is treated as parameters rather than constraints, so that a decision can be made outside of traditional feasible regions. This is why the present solution works robustly with complex data for general decision-making applications. Note that FIG. 16 is a simplified representation that could have as many as P dimensions.

The above TABLE 1 can be modified in accordance with the present solution. For example, each row is associated with a respective machine learned model of a plurality of machine learned models, and each column is associated with a respective modulation class of a plurality of modulation classes. For example, a first machine learned model was generated using a first machine learning algorithm. A second machine learned model was generated using a second different machine learning algorithm. A third machine learned model was generated using a third machine learning algorithm that is different from the first and second machine learning algorithms. Each cell in the body of the table includes a likelihood score S. The following TABLE 2 illustrates this configuration.

TABLE 2

| | Modulation Class 1 | Modulation Class 2 | Modulation Class 3 | Modulation Class 4 |
|---|---|---|---|---|
| First Machine Learned Model | $S_1$ | $S_4$ | $S_7$ | $S_{10}$ |
| Second Machine Learned Model | $S_2$ | $S_5$ | $S_8$ | $S_{11}$ |
| Third Machine Learned Model | $S_3$ | $S_6$ | $S_9$ | $S_{12}$ |

The likelihood scores can include, but are not limited to, goodness-of-fit-predicted scores calculated based on the number of signals and modulation classes. Each goodness-of-fit-predicted score describes how well the machine learned model and modulation class fit a set of observations. A measure of goodness-of-fit summarizes the discrepancy between observed values and the values expected under the machine learned model in question. The goodness-of-fit-predicted score can be determined, for example, using a chi-squared distribution algorithm and/or a likelihood ratio algorithm. The modulation classes can include, but are not limited to, frequency modulation, amplitude modulation, phase modulation, angle modulation, and/or line coding modulation.

The reward matrix illustrated by TABLE 2 can be constructed and solved using a linear program. For example, an interior-point algorithm can be employed. A primal standard form can be used to calculate optimal tasks and characteristics in accordance with the following mathematical equation (10).

$$\text{maximize } f(x) s.t. \quad (10)$$

$$A(x) \leq b$$

$$x \geq 0$$

Figure 17:
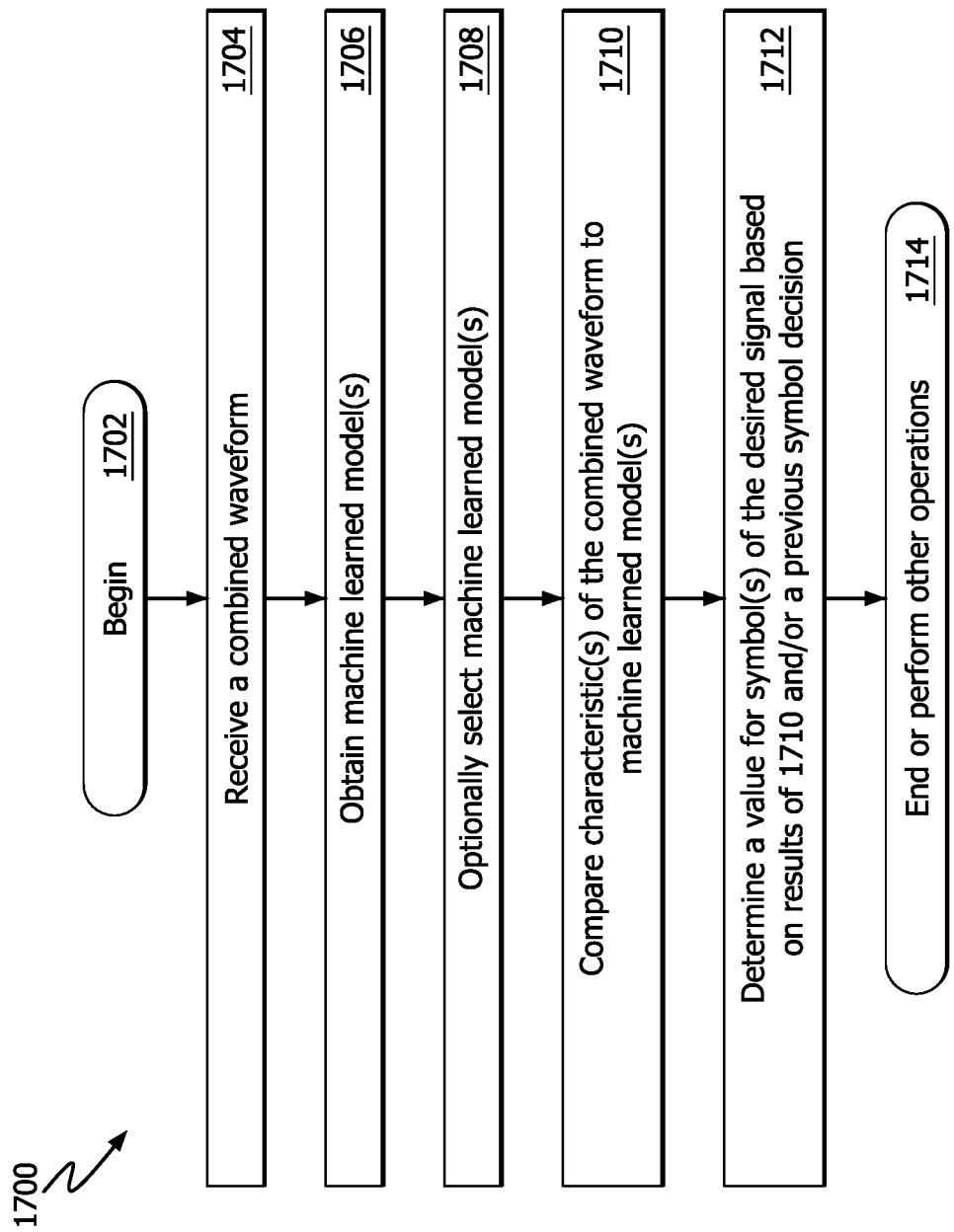
FIG. 17 provides a flow diagram for operating a receiver.

Referring now to FIG. 17, there is provided a flow diagram of an illustrative method 1700 for operating a receiver (e.g., receiver 104 of FIG. 1 and/or 200 of FIG. 2). Method 1700 begins with 1702 and continues with 1704 where the receiver receives a combined waveform (e.g., combined waveform 806 of FIG. 8) comprising a combination of a desired signal (e.g., desired signal 802 of FIG. 8) and an interference signal (e.g., interference signal 804 of FIG. 8). Next in 1706-1712, the receiver performs demodulation operations to extract the desired signal from the combined waveform. The demodulation operations comprise: obtaining machine learned models for recovering the desired signal from combined waveform (e.g., from memory 310 of FIG. 3); optionally selecting one or more machine learned models based on a given criteria (e.g., based on results of a game theory analysis of the machine learned models); comparing characteristic(s) of the received combined waveform to the machine learned model(s); and determining a value for at least one symbol of the desired signal based on results of the comparing and/or a previous symbol decision. Subsequently, 1714 is performed where method 1700 ends or other operations are performed (e.g., return to 1702).

The machine learned models may be generated using the same machine learning algorithm or respectively using different machine learning algorithms. The characteristic(s) of the received combined waveform may include, but is(are) not limited to, a phase characteristic (e.g., a phase change over time), an amplitude characteristic (e.g., an average amplitude over time), a frequency characteristic (e.g., a change in frequency over time), or a waveform shape.

The results of the comparing may comprise an identification of a machine learned model that matches the characteristic(s) of the received combined waveform by a given amount (e.g., >50%). The value for the symbol(s) of the desired signal may be set equal to symbol value(s) that is(are) associated with the identified machine learned model.

In some scenarios, 1710 comprises comparing characteristic(s) of each segment of a plurality of segments of the combined waveform to the machine learned models to identify a machine learned model that matches the characteristic(s) of the segment by a given amount. At least two segments may both comprise information for at least one given symbol of the desired signal. Each segment may extend over multiple symbol time periods. In 1712, a value for a symbol for the desired signal contained in the segment of the combined waveform may be set equal to a symbol value that is associated with the machine learned model that matches the characteristic(s) of the segment by the given amount.

The implementing systems of method 1700 may comprise a receiver having an antenna (e.g., antenna 202 of FIG. 2) and/or a symbol demodulator (e.g., symbol demodulator/interference canceller 214 of FIG. 2). The antenna is configured to receive the combined waveform comprising a combination of the desired signal and the interference signal. The symbol demodulator comprises a processor (e.g., processor 304 of FIG. 3), and a non-transitory computer-readable storage medium (e.g., memory 310 and/or hardware entities 312 of FIG. 3) comprising programming instructions (e.g., instructions 320 of FIG. 3) that are configured to cause the processor to implement method 1700.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a receiver, comprising:
   receiving, at the receiver, a combined waveform comprising a combination of a desired signal and an interference signal; and
   performing, by the receiver, demodulation operations to extract the desired signal from the combined waveform, the demodulation operations comprising:
      obtaining, by the receiver, machine learned models for recovering the desired signal from combined waveforms;
      comparing, by the receiver, at least one characteristic of the received combined waveform to at least one of the machine learned models; and
      determining a value for at least one symbol of the desired signal based on results of the comparing.

2. The method according to claim 1, wherein the machine learned models are generated using a same machine learning algorithm or respectively using different machine learning algorithms.

3. The method according to claim 1, wherein the at least one characteristic of the received combined waveform comprises a phase characteristic, an amplitude characteristic, a frequency characteristic, or a waveform shape.

4. The method according to claim 1, wherein the results of the comparing comprise an identification of a machine learned model that matches the at least one characteristic of the received combined waveform by a given amount.

5. The method according to claim 4, wherein the determining comprises setting the value for the at least one symbol of the desired signal equal to a symbol value that is associated with the identified machine learned model.

6. The method according to claim 1, wherein the demodulation operations further comprise comparing at least one characteristic of each segment of a plurality of segments of the combined waveform to the machine learned models to identify a machine learned model that matches the at least one characteristic of the segment by a given amount.

7. The method according to claim 6, wherein at least two segments of the plurality of segments both comprise information for at least one given symbol of the desired signal.

8. The method according to claim 6, wherein each segment of the plurality of segments extends over multiple symbol time periods.

9. The method according to claim 6, wherein the demodulation operations further comprise setting a value for at least one symbol for the desired signal contained in the segment of the combined waveform equal to a symbol value that is associated with the machine learned model that matches the at least one characteristic of the segment by the given amount.

10. The method according to claim 1, wherein the value for the at least one symbol of the desired signal is determined further based on results of a previous symbol decision.

11. The method according to claim 1, further comprising selecting a machine learned model from the machine learned models for use in said comparing based on results of a game theory analysis of the machine learned models.

12. A receiver, comprising:
    a processor; and
    a non-transitory computer-readable storage medium comprising programming instructions that are configured to cause the processor to implement a method for performing demodulation operations to extract the desired signal from a combined waveform comprising a combination of a desired signal and an interference signal, wherein the programming instructions comprise instructions to:
    obtain machine learned models for recovering the desired signal from combined waveforms;
    compare at least one characteristic of the received combined waveform to at least one of the machine learned models; and
    determine a value for at least one symbol of the desired signal based on results of the comparing.

13. The receiver according to claim 12, wherein the machine learned models are generated using a same machine learning algorithm or respectively using different machine learning algorithms.

14. The receiver according to claim 12, wherein the at least one characteristic of the received combined waveform comprises a phase characteristic, an amplitude characteristic, a frequency characteristic, or a waveform shape.

15. The receiver according to claim 12, wherein the results of the comparing comprise an identification of a machine learned model that matches the at least one characteristic of the received combined waveform by a given amount.

16. The receiver according to claim 15, wherein the value for the at least one symbol of the desired signal is set equal to a symbol value that is associated with the identified machine learned model.

17. The receiver according to claim 12, wherein the programming instructions further comprise instructions to compare at least one characteristic of each segment of a plurality of segments of the combined waveform to the machine learned models to identify a machine learned model that matches the at least one characteristic of the segment by a given amount.

18. The receiver according to claim 17, wherein at least two segments of the plurality of segments both comprise information for at least one given symbol of the desired signal.

19. The receiver according to claim 17, wherein each segment of the plurality of segments extends over multiple symbol time periods.

20. The receiver according to claim 17, wherein the programming instructions further comprise instructions to set a value for at least one symbol for the desired signal contained in the segment of the combined waveform equal to a symbol value that is associated with the machine learned model that matches the at least one characteristic of the segment by the given amount.

21. The receiver according to claim 12, wherein the value for at least one symbol of the desired signal is determined further based on results of a previous symbol decision.

22. The receiver according to claim 12, wherein the programming instructions further comprise instructions to select a machine learned model from the machine learned models for use in said comparing based on results of a game theory analysis of the machine learned models.

* * * * *